April 24, 1928.  H. E. YOUNG  1,667,467
GARAGE
Filed Feb. 16, 1927   9 Sheets-Sheet 1

April 24, 1928.  H. E. YOUNG  1,667,467
GARAGE
Filed Feb. 16, 1927  9 Sheets-Sheet 2

Inventor:
Hugh E. Young

April 24, 1928.  H. E. YOUNG  1,667,467
GARAGE
Filed Feb. 16, 1927  9 Sheets-Sheet 4

Inventor:
Hugh E. Young,
By Dynenforth, Lee, Chritton & Wiles, Attys.

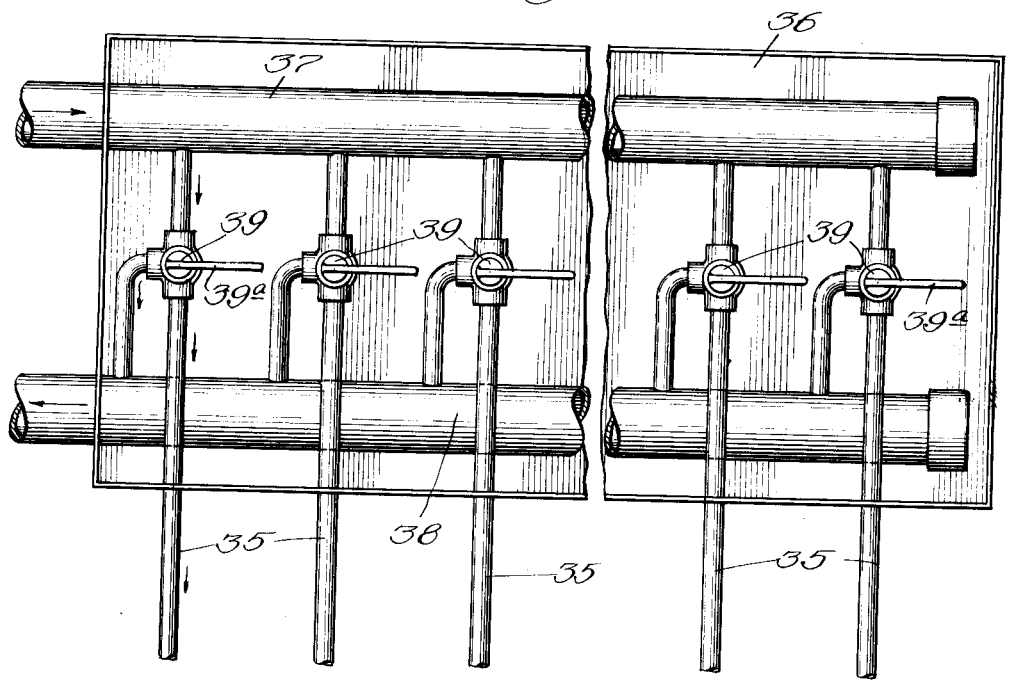
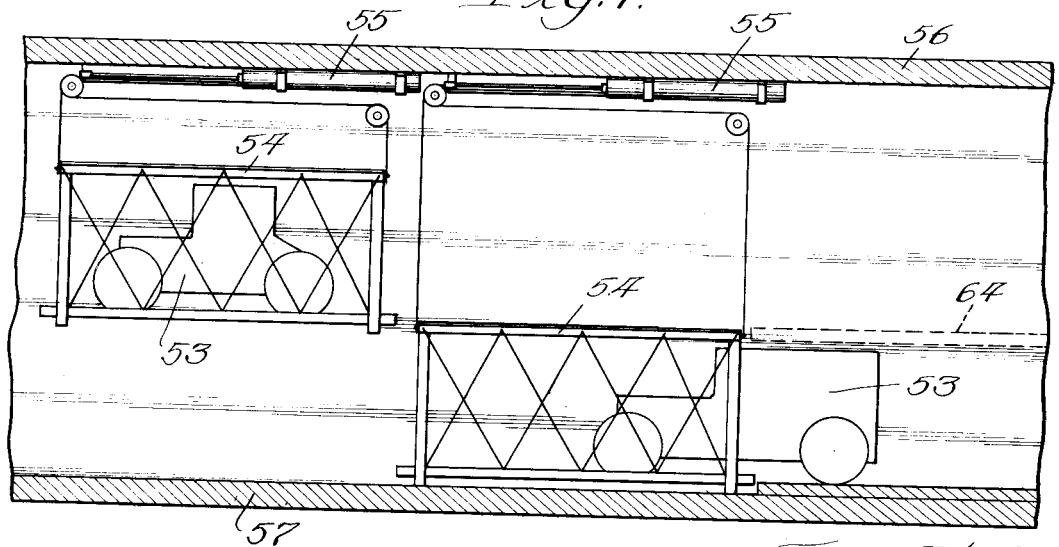

April 24, 1928.                          1,667,467
H. E. YOUNG
GARAGE
Filed Feb. 16, 1927        9 Sheets-Sheet 6
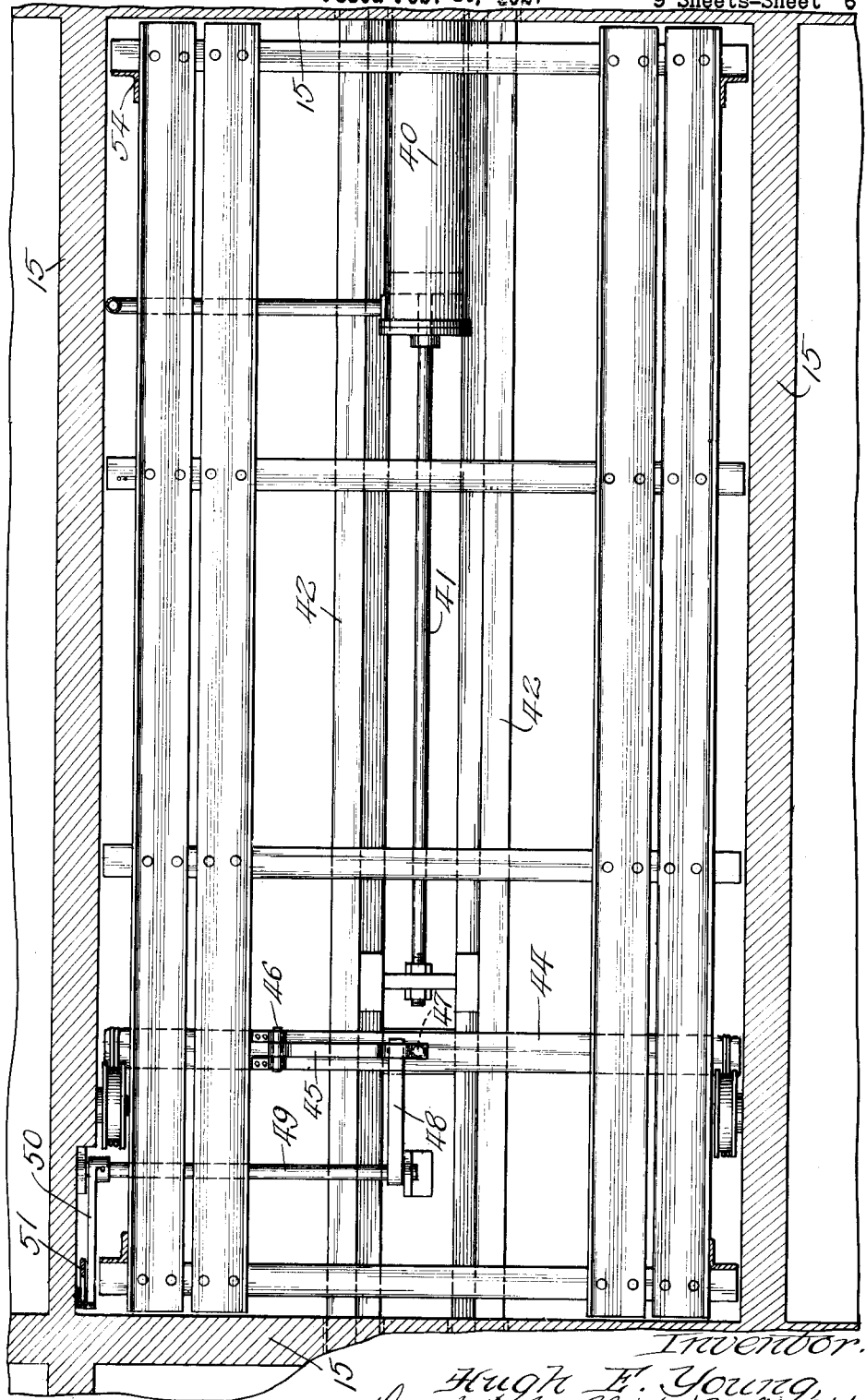
Inventor:
Hugh E. Young,
By Dynnforth, Lee, Chritton & Wiles, Attys.

April 24, 1928. 1,667,467
H. E. YOUNG
GARAGE
Filed Feb. 16, 1927 9 Sheets-Sheet 7
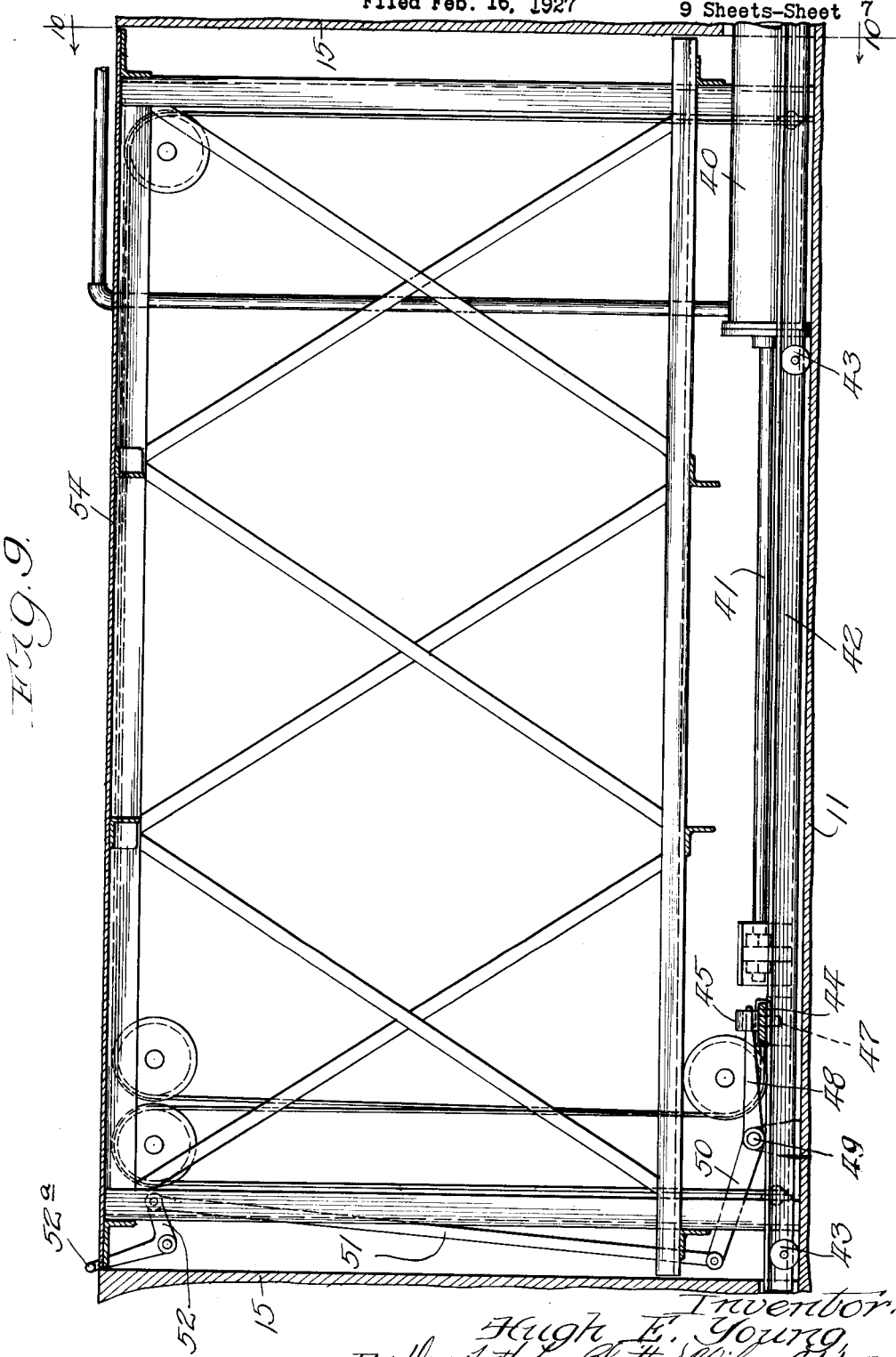

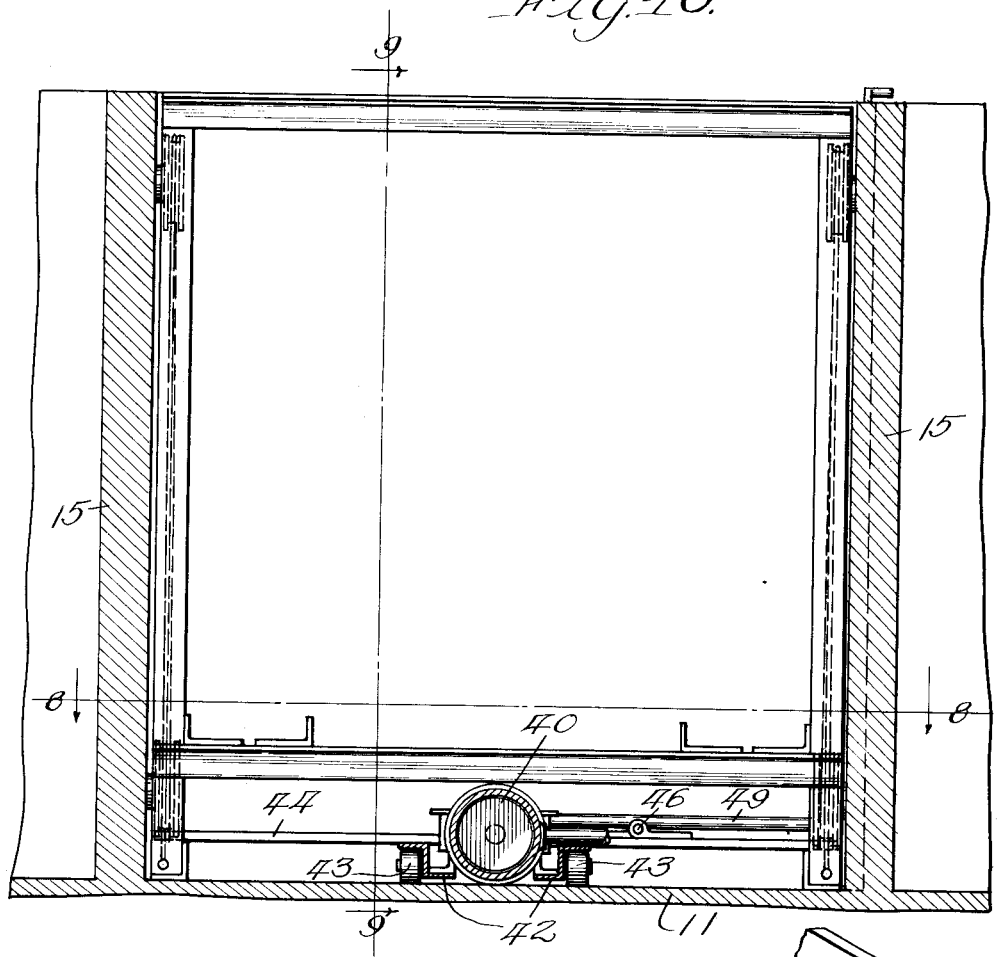
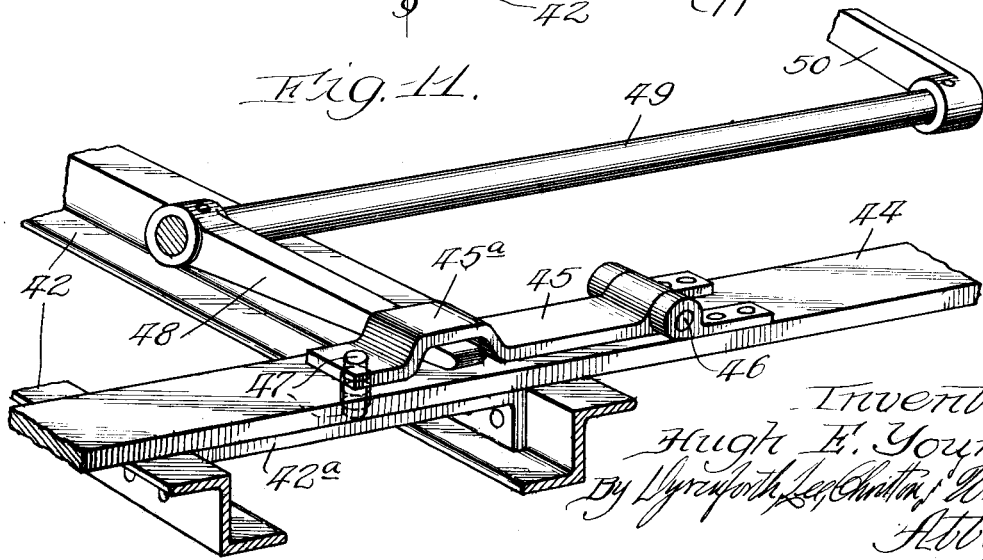

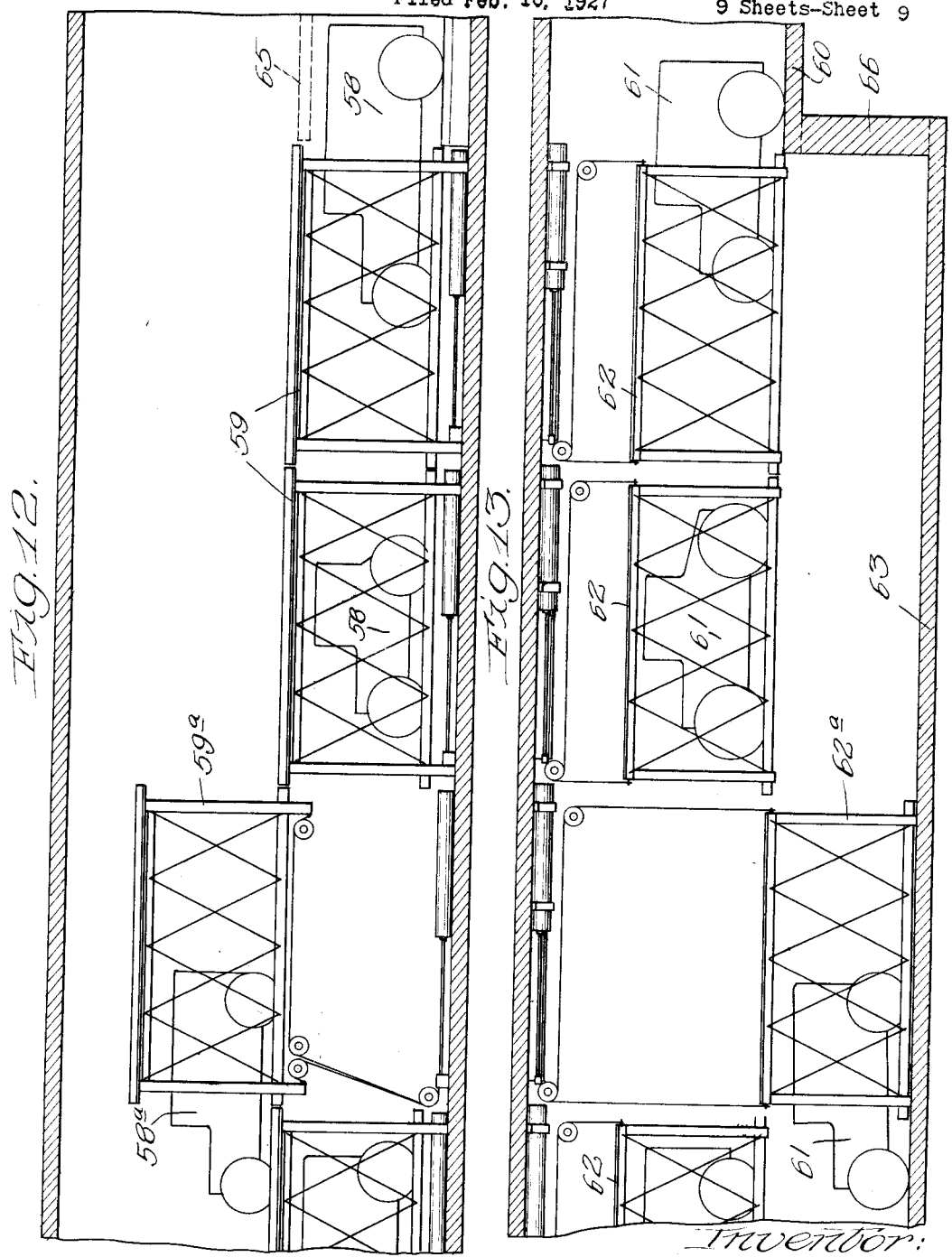

Patented Apr. 24, 1928.

1,667,467

UNITED STATES PATENT OFFICE.

HUGH E. YOUNG, OF CHICAGO, ILLINOIS, ASSIGNOR OF ONE-HALF TO EUGENE S. TAYLOR.

GARAGE.

Application filed February 16, 1927. Serial No. 168,620.

This invention relates to improvements in garages and more specially to a storage garage adapted for storing or housing vehicles, such as, for example, motor vehicles.

By the use of my invention, there is great economy in space provided in the storing of motor vehicles and individual vehicles may readily be placed in storage and removed therefrom with little or no disturbance to the remaining vehicles and with practically no danger of injury by collision. The invention is especially valuable for use in larger cities, and metropolitan districts where storage space for motor vehicles is at a premium and where the placing of vehicles in storage and their removal therefrom with ease and facility is especially desirable.

For the purpose of illustration, I have shown a single floor or story embodying my invention; but it is to be understood that a plurality of floors or stories may be constructed in a garage or building of any height, without detracting from the spirit of my invention. In the event, the invention is embodied in more than one story, vehicles may be raised to and lowered from the upper stories by means of elevators, ramps, or any other similar device now in common use.

Among the features of my invention, is the provision of quick, easy, safe and economical storage for vehicles. By the use of my invention, there may also be provided practically fire-proof storage.

Other features and advantages of my invention will appear more fully as I proceed with my specification.

Figure 1:
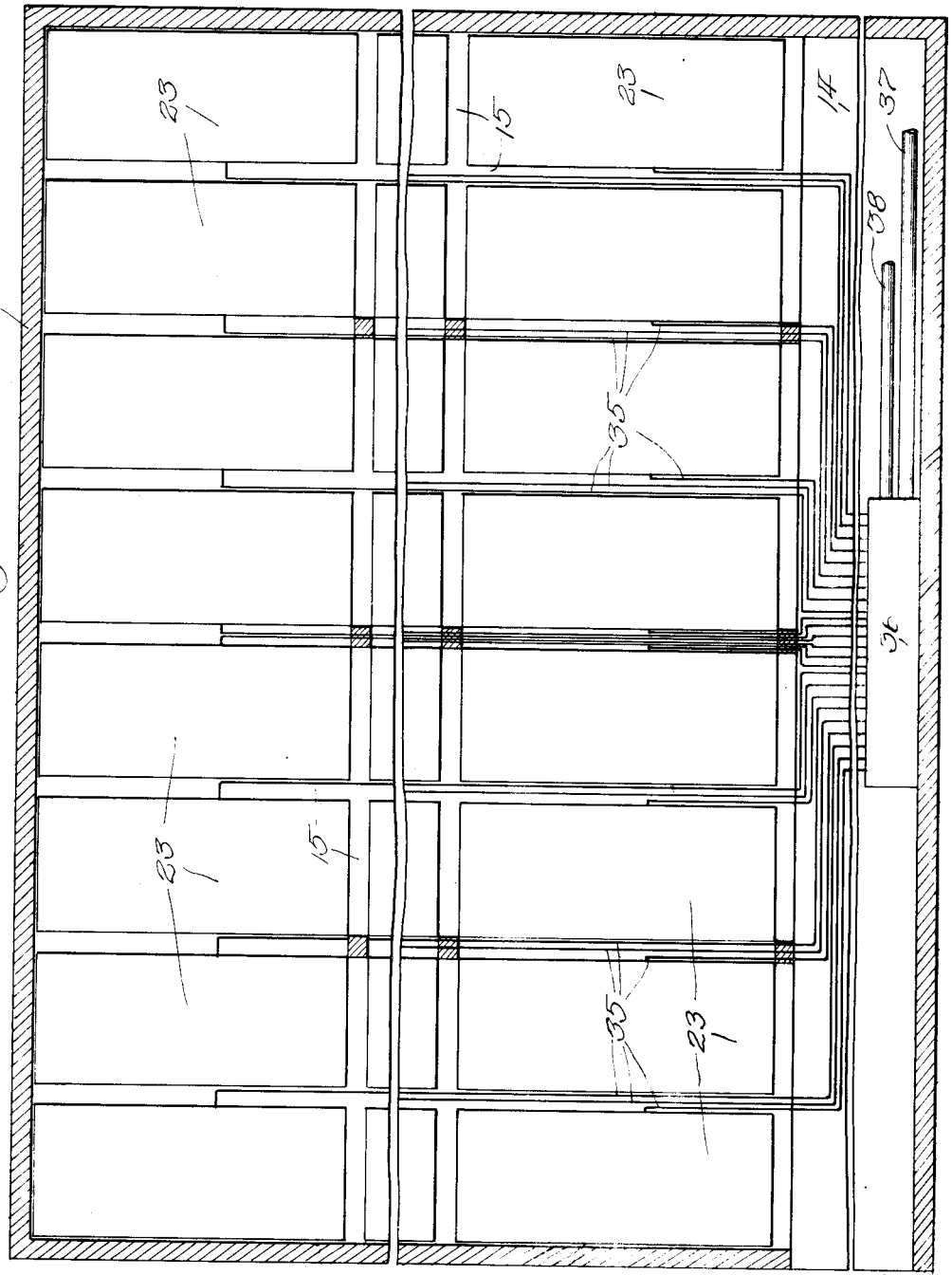
Figure 2:
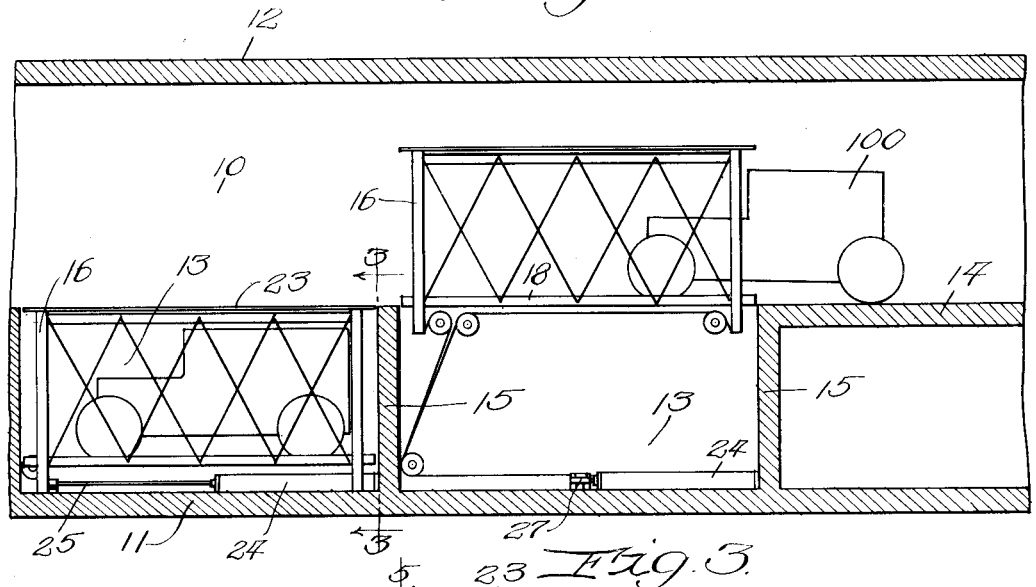
Figure 3:
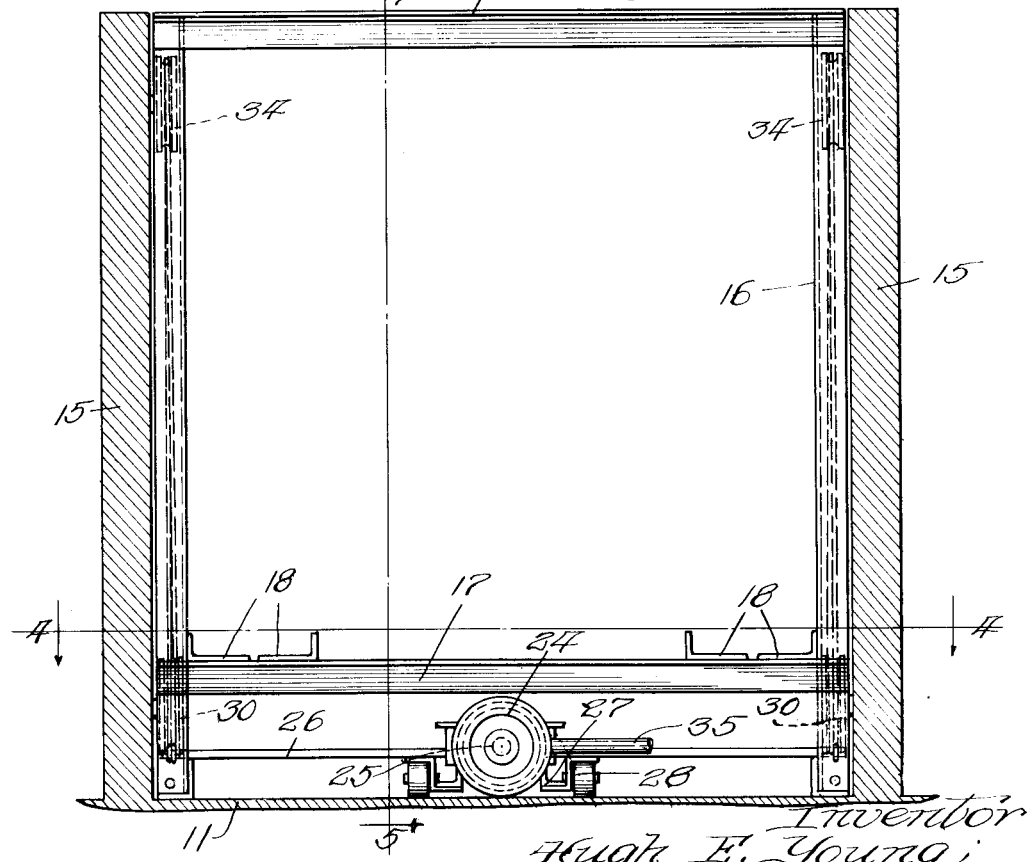
Figure 4:
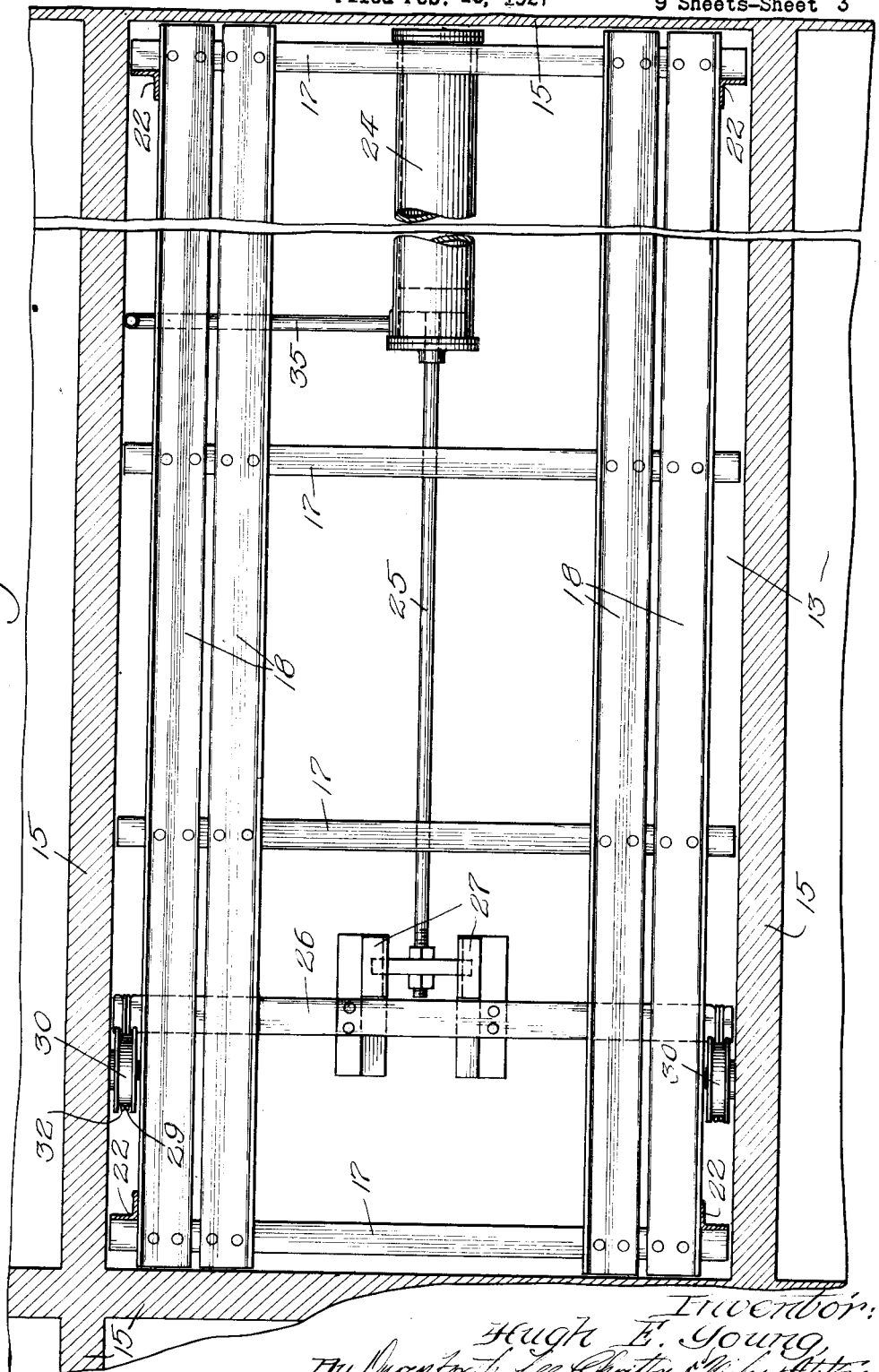
Figure 5:
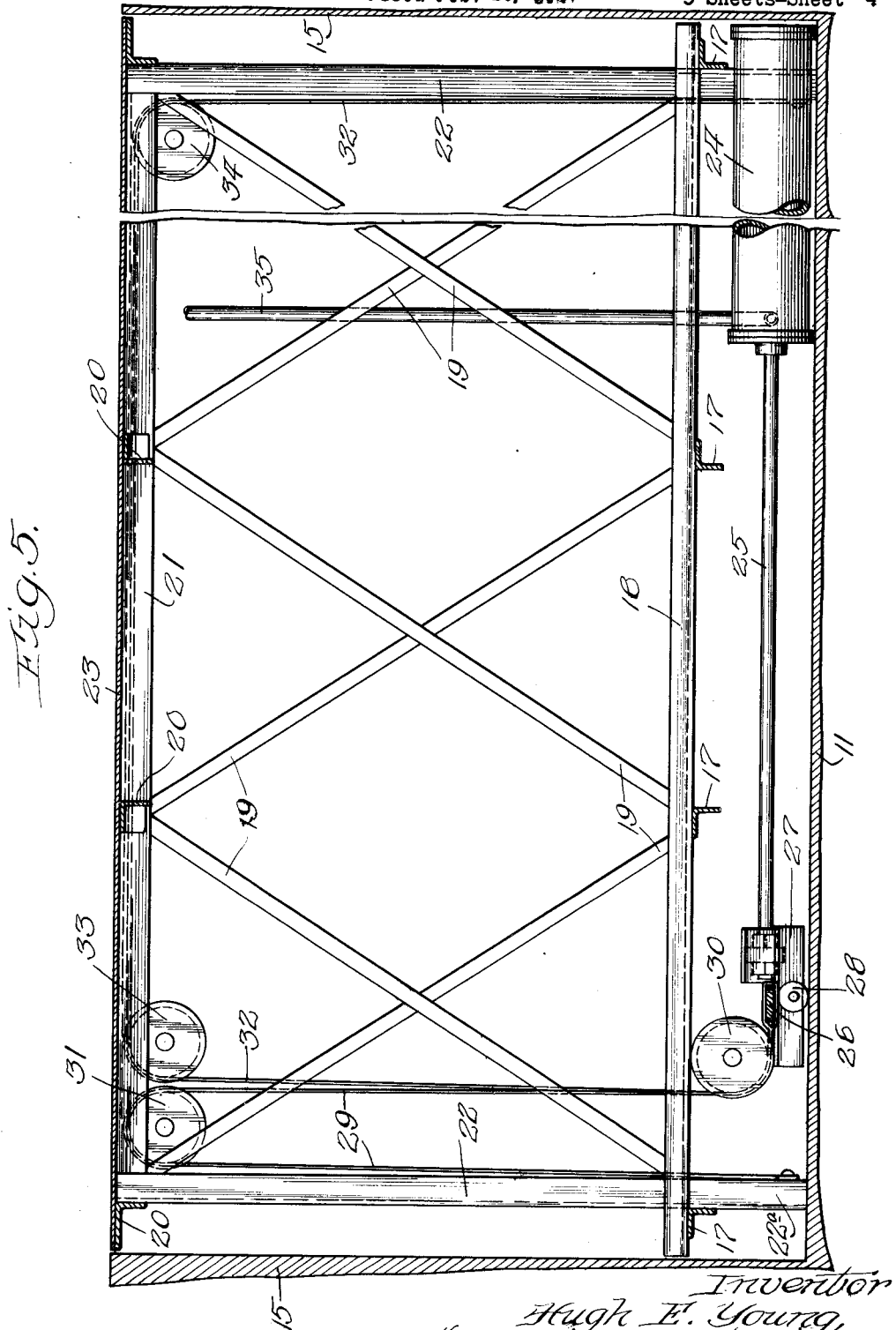

In that form of device embodying the features of my invention shown in the accompanying drawings, Fig. 1 is a diagrammatical, fragmentary, plan view of a single floor or story of a storage garage embodying the features of my invention, Fig. 2 is a vertical sectional view, Fig. 3 is a view taken as indicated by the line 3 of Fig. 2, Fig. 4 is a view taken as indicated by the line 4 of Fig. 3, Fig. 5 is a view taken as indicated by the line 5 of Fig. 3, Fig. 6 is a fragmentary and enlarged view in front elevation of the control valves, Fig. 7 is a view similar to Fig. 2 showing a modified form, Fig. 8 is a view taken as indicated by the line 8 of Fig. 10 showing a modified form, Fig. 9 is a view taken as indicated by the line 9 of Fig. 10 showing a modified form, Fig. 10 is a view similar to Fig. 3 showing a modified form, Fig. 11 is a view in perspective of the engaging latch mechanism used in the device illustrated in Figs. 8, 9 and 10, Fig. 12 is a view similar to Fig. 2 showing a modified form, and Fig. 13 is a view similar to Fig. 2 showing another modified form.

As shown in the drawings, Fig. 1 illustrates one floor or story of a garage, the outer walls being indicated by 10. In Fig. 2 the floor is indicated by 11 and ceiling by 12. In the practice of my invention, the inside clearance or distance between the floor 11 and the ceiling 12 is preferably about 16 or 17 feet. Substantially the entire floor area is divided into storage spaces or pits 13, 13. There may be as many of these as the floor area will permit and they are preferably arranged in rows as shown in Fig. 1 where, for illustration, I have shown eight rows of such storage spaces across the width of the building and as many in each row as the length of the building will permit. In Fig. 1, the portion broken away, may represent as many of such storage spaces in each row as may be accommodated in the particular building embodying my invention. At one end of the building, there is preferably left a strip 14 free from such storage spaces or pits to permit vehicles to travel thereon to enter the different rows. It is to be noted, however, as will be more specifically explained hereinafter, that such space 14 need not extend across the ends of all the rows. In fact, such space 14 may be dispensed with entirely and the entire floor area completely filled with the storage spaces 13. Where the space 14 is provided it is raised as illustrated in Fig. 2 to a height so that when one of the cages, to be hereinafter described, is in position in one of the pits 13, the top of said cage will be substantially level with the platform 14.

The storage spaces or pits 13 are preferably separated by fire walls 15, each extending high enough so that its upper edge will be substantially flush with the roof or top of one of the cages, to be hereinafter described, when such cage is in its lowered or storage position.

In each of the storage spaces there is provided a cage or elevator indicated in general by 16. Each of these cages or elevators is preferably made of bottom angle iron cross members 17 supporting longitudinally arranged angle irons 18, arranged in pairs on each side to provide channeled rails to receive the wheels of a vehicle entering the cage. Suitable crossed side bracing members 19, 19 are provided to join the bottom of the cage to the upper transverse angle irons 20, and the longitudinal angle irons 21 and corner posts 22 are provided to form a rigid rectangular cage or elevator. The corner members 22 are preferably extended downwardly beyond the tracks 18 as indicated by 22$^a$ in order to hold the floor of the cage a slight distance above the floor 11 when the cage rests on the bottom. This additional space provides room for the operating mechanism to be described hereinafter. The cage formed of the members 17, 18, 19, 20, 21, and 22 may be formed in any other desirable manner in order to provide a rigid, strong elevator cage adapted to hold a vehicle.

The top of the cage is covered by a roof here shown as being a flat piece of sheet metal 23, covering the entire top of the cage. When the cage is in the lowered position with the lower ends of the corner post 22$^a$ resting on the floor 11 this plate 23 is substantially flush with the tops of the walls 15 and also with the loading platform 14, in case one is provided.

Each cage is provided with any suitable lifting mechanism here shown as a hydraulic cylinder 24 provided with the usual piston to which is connected a piston rod 25, having attached to its end a suitable yoke or link 26 resting on the carriage 27 mounted on the wheels 28. To each end of the yoke 26 are attached two cables, one indicated by 29 passing over the pulley 30 and pulley 31 and attached to one lower corner of the cage. The other cable is indicated by 32 and passes over the same pulley 30 thence over the pulleys 33 and 34 and thence downwardly and its end is attached to the other lower corner of the cage on the same side. A similar pair of cables is provided on the other side of the cage attached to the other end of the yoke 26. There being provided a pair of cables like this on each side of the cage, it is seen that movement of the carriage 27 to the right (viewed in Fig. 5) will raise the cage. The movement of the cage is sufficient so that when it is in its raised position the rails 18 will be substantially flush with the top 23 of a lowered cage. This operation of the cages is quite clearly shown in Fig. 2 where two such cages are illustrated, the one on the right being raised and the one on the left being in lowered position.

Any suitable means may be provided for operating the pistons in the hydraulic cylinders 24, and I have here shown each cylinder as provided with a pipe 35 through which fluid may be conducted to or from the cylinder in front of the piston. These pipes are shown diagrammatically in Fig. 1 where it will be noted they are all led to a single mounting board 36 for supporting the control valves. Some of these valves are shown on an enlarged scale in Fig. 6 where 37 indicates an inlet pipe. The pipe 37 is adapted to receive fluid from any suitable pump or compressor (not shown) and by means of the 3-way valves 39 with controlling handles 39$^a$ the fluid from pipe 37 may be directed into any one of the pipes 35 in order to raise the corresponding cage. When it is desired to lower the cage, the valve 39 may be turned so that fluid will flow from the cylinder 24 through the pipe 35 and out through the pipe 38, thus allowing the cage to descend. Each of the valves 39 is an ordinary 3-way valve and the details of construction need not be shown as such valves are old in the art. That is, the valve is so constructed that in one position it will pass fluid from pipe 37 to the pipe 35, and in another position will permit escape of fluid from the pipe 35 to the pipe 38.

In the practice of my invention as thus far disclosed, it will be seen that any one of the cages 16 may be raised or lowered as desired by operation of the controlling valve 39 through manipulation of the handle 39$^a$. When all the cages are lowered, all the tops thereof 23, 23 will be flush and form virtually a floor which is entirely unobstructed and free. That is, vehicles 100 may pass to and fro over the tops of the lowered cages entirely freely. When it is desired to store a vehicle, one of the cages is raised, the vehicle enters it, and the cage is then lowered, thus housing or storing the vehicle in the pit and inclosing all sides by the fire walls 15, at the same time permitting other vehicles to pass freely over the top of the cage thus lowered. In this manner, every one of the pits may be filled and still the entire area of the floor above said cages may be entirely free and unobstructed. It will be seen, therefore, that substantially 100% of the area of the floor space may be utilized for storage and yet leave the same area entirely free and unobstructed for the passage of vehicles to and fro. Of course, if desired, after all the cages are filled, additional vehicles may be stored on top of the cages to any extent desired in the same manner that vehicles are now stored on the floor of an ordinary garage. When it is desired to remove any vehicle in a cage, the cage is raised, the vehicle passes out over the roofs of the other cages and leaves the garage. The empty cage may then remain in raised position until it receives another car for storage, or it may be lowered in order to permit other cars to pass over its top. In case a loading platform 14 is provided, across the ends of the rows of storage spaces, such a platform will facilitate to a certain extent the movement of cars in entering and leaving the cages. By means of such a platform 14, more easy access is given to the end cages or elevators in each row adjacent to such platform. However, such platform may be entirely dispensed with and the entire area of the floor filled with cages 16. In such case, a car may enter at any point and run over the tops of the lowered cages. Whenever one cage is raised to receive the car, it may maneuver as desired over the tops of the other cages until it enters the raised cage and such raised cage is then lowered, whereupon other cars may run over its top in a similar manner.

It will be seen that by means of my invention in case all the cages are filled, any single car may be very quickly taken out and removed without in any way disturbing the other cars. This is accomplished by merely raising the particular cage, and letting the car pass out over the tops of the other cages. Likewise, any empty cage may be filled at any time very easily and quickly by merely raising that cage, allowing the car to pass over the tops of the other cages, into the same and be lowered into the pit below. In the event additional cars are stored on the tops of the lowered cages, after all the lowered cages are filled, this gives just so much additional storage, although in such case, obviously, cars in storage on the tops of the lowered cages may in some cases have to be moved about more or less in order to permit the removal of certain cars from the cages, or their storage therein.

In Figs. 8, 9, and 10 I have shown a modified form of device which differs to a certain extent from the preferred form in connection with the elevating mechanism. As here shown, I have not provided a separate elevating mechanism for each cage, but have provided a single cylinder 40 similar to the hydraulic cylinder 24, except that in this modified form the single cylinder 40 is adapted to lift all the cages in any one row. To this end, the cylinder 40 has the usual piston and piston rod 41, which in turn is connected to a long carriage comprising the two parallel members 42, 42 supported by the rollers 43. This carriage 42 is of sufficient length to extend the entire length of all the cages in any single row. When the piston rod 41 moves, this long carriage 42, also moves. Each of the cages is provided with a set of cables similar to those described in connection with the cage 16 and the lower ends of the cables of each cage are joined to a corresponding yoke or link 44. Normally, there is no connection between the link 44 and the carriage 42, consequently the latter is free to move back and forth without raising the cage. In the event it is desired to raise any particular cage, suitable latch mechanism is provided to latch the yoke 44 to the carriage 42 so that when the same moves the cables will be pulled to elevate the cage in the same manner as the cage 16 is elevated as above described. This latch mechanism may be of any suitable type and I have here shown the yoke 44 carrying an arm 45 pivoted at 46 and provided at its other end with a pin 47 adapted to enter a hole in the link 44 and fall into a corresponding hole in the cross member 42$^a$ fastened to the carriage members 42. When the arm 45 is raised the pin is out of engagement with the member 42$^a$ and consequently the same may move freely beneath the yoke 44 without carrying the same along. When the arm 45 is lowered and the pin is in the hole in member 42$^a$, such member and the yoke 44 are locked together so that movement of the carriage member 42 moves the yoke 44 to raise the cage. Any suitable means may be provided for engaging or disengaging the latch mechanism just described. For example, I have here shown an arm 48 having its end lying beneath an offset part 45$^a$ of the arm 45. The arm 48 is attached to a shaft 49 which may be turned by means of the arm 50 having its end attached to the link 51, which in turn is attached to one end of a bell crank lever, the other end of said bell crank lever, as indicated by 52$^a$ being located just above the top of the cage (when lowered) and serving as an operating handle to engage or disengage the latch mechanism just mentioned. Reference to Fig. 9 will show the latch as engaged. Movement of the end 52$^a$ to the right (as viewed in this figure) will push the link 51 downwardly, rotate the shaft 49 in a counterclock-wise direction, raise the end of the arm 48 and this in turn will lift the pin 47 out of the hole in the member 42$^a$, thus releasing the yoke 44 from the carriage 42.

I have now described the broad idea of my invention, which is the use of individual cages and the storage of cars in a different plane from that in which the cars leave such cages. There are three modifications, all embodying this broad idea which I shall now describe.

In the device shown in Fig. 7, the cars as indicated by 53 enter the cages when lowered and the cages are then raised to store the vehicles. When thus raised, vehicles may pass freely to and fro below such cages. In Fig. 7 the cage on the right is shown in lowered position with a vehicle entering and the one on the left is shown in a raised position with the vehicle in storage. These cages may be raised and lowered by means of hydraulic cylinders 55 operating substantially the same as the cylinders 24. In this form of device, however, such cylinders obviously must be located on the ceiling 56 so that the floor 57 will be unobstructed and free for the movement of cars when the cages are raised. In each of the forms shown in Figs. 2 and 7, the cars enter the cages when in non-storage position, and the cages are then moved to storage position. In Fig. 2 the cages are lowered to storage position; and in Fig. 7 the cages are raised to storage position.

Obviously, if desired, the cars may enter the cages when in storage position and such cages may then be moved out of the storage plane to permit the cars to leave. Two forms of this device may also be made. These are embodied in Figs. 12 and 13. In Fig. 12 the cars are stored in the lower plane similar to the storage shown in Fig. 2. In the device shown in Fig. 12, however, the cars 58 are adapted to enter the cages 59 when in their lowered position. This is accomplished by arranging the cages in rows and omitting the fire walls so that a car may run through an entire row of lowered cages. When the cages are all empty, therefore, an entering car may run through the entire row and stop in the end cage. Another car may then run through and stop in the cage next to the end cage; and in this way the entire row may be filled. When it is desired to remove any car, the cage as indicated by 59ª in Fig. 12 may be raised and the car 58ª taken out over the tops of the other cages in the same manner as cars are removed from storage in the device shown in Fig. 2. When one cage in the middle of a row is thus emptied, the cars in the other cages in the row behind this may be moved forward and the end cage again filled.

In Fig. 13 the storage of the cars is shown in a raised plane but this differs from the device shown in Fig. 7 in that cars are permitted to enter the cages while in their raised or storage position. This is accomplished by arranging the cages in rows and having their ends adjacent and open as shown in Fig. 12 so that a car may enter the row and pass through the cages and thus fill the entire row. In a device of this kind, there is preferably provided an elevated platform 60 opposite the floors of the cages 62 when they are raised in order to permit the car 61 to enter any row of cages when raised. When any car is removed from storage, the cage as indicated by 62ª is lowered, permitting the car to pass out over the floor 63 beneath the raised cages.

In general, it will be seen that my invention comprises the storage of cars in separate elevators or cages which may be raised and lowered; said cages being in one plane when in storage position and adapted to be moved out of this plane to release the cars. The storage plane may be below the plane in which the cars are removed as shown in Figs. 2 and 12, or above it as shown in Figs. 7 and 13. The cars may enter the cages when out of the storage plane as shown in Figs. 2 and 7; or they may enter the cages when in the storage plane as shown in Figs. 12 and 13. In case the storage is in a depressed plane and the cars do not enter in such plane, as shown in Fig. 2, fire walls may be provided between the cages when in storage position. Although I have shown the cars as entering the cages when in storage position, in Figs. 12 and 13, and have shown the cars as entering the cages when not in storage position in Figs. 2 and 7; it is obvious that one or more combinations of these different forms may be made if desired. For example, in any of the forms shown in Figs. 7, 12 and 13, means may be provided to permit the cars to enter the cages in either the storage or non-storage position. For example, in Fig. 7 I have shown in broken lines an elevated platform 64 that may be provided to permit cars to enter the cages when in their raised position as well as when in lowered position; and likewise in Fig. 12 such an elevated platform 65 could also be provided. In the same manner, in the device shown in Fig. 13, an entrance could be made through the wall 66, as indicated by the dotted lines, in order to permit vehicles to enter the cages 62 when in their lowered position.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. In a storage garage for vehicles, a plurality of cages adapted to lie in a single storage plane and substantially fill a storage space of predetermined area, each cage adapted to contain a vehicle, each cage having a top, said cages being separated by fire walls when in the storage plane, and means for raising each cage out of the storage plane to permit egress of a vehicle therefrom over the tops of adjacent cages.

2. In a storage garage for vehicles, a plurality of cages adapted to lie in a single storage plane and substantially fill a storage space of predetermined area, fire walls between the cages when lying in the storage plane, each cage adapted to contain a vehicle, and means for moving each cage out of the storage plane to permit egress of a vehicle therefrom.

3. In a storage garage for vehicles, a plurality of cages arranged in rows and adapted to lie in a single storage plane and substantially fill a storage space of predetermined area, each cage adapted to contain a vehicle, and means for moving each cage out of the storage plane to permit egress of a vehicle therefrom, said moving means comprising a moving member in conjunction with each row of cages and releasable means for engaging any cage in said row therewith to move the same.

4. In a storage garage for vehicles, a plurality of cages arranged in rows and adapted to lie in a single storage plane and substantially fill a storage space of predetermined area, each cage adapted to contain a vehicle and each having a top, and means for raising each cage out of the storage plane to permit egress of a vehicle therefrom over the tops of adjacent cages, said raising means comprising a lifting member in conjunction with each row of cages and releasable means for engaging any cage in the row with said lifting means to lift the same.

5. In a storage garage for vehicles, a plurality of cages arranged in rows and adapted to lie in a single storage plane and substantially fill a storage space of predetermined area, each cage adapted to contain a vehicle, the adjacent ends of the cages in each row being open and each cage having a top, and means for raising each cage out of the storage plane to permit egress of a vehicle therefrom, over the tops of adjacent cages, said raising means comprising a lifting member in conjunction with each row of cages, and releasable means for engaging each cage in the row with said lifting member.

In testimony whereof, I have hereunto set my hand this 7 day of February, A. D. 1927.

HUGH E. YOUNG.